United States Patent [19]
Jung et al.

[11] Patent Number: 5,776,992
[45] Date of Patent: Jul. 7, 1998

[54] HALOGEN-FREE, FLAME RETARDANT RIGID POLYURETHANE FOAM

[75] Inventors: Siegfried Jung, Karben; Horst Staendeke, Lohmar, both of Germany

[73] Assignee: Hoechst Aktiengesellschaft, Frankfurt, Germany

[21] Appl. No.: 909,225

[22] Filed: Aug. 11, 1997

Related U.S. Application Data

[63] Continuation of Ser. No. 736,829, Oct. 28, 1996, abandoned.

[30] Foreign Application Priority Data

Nov. 3, 1995 [DE] Germany .......................... 195 41 037.8

[51] Int. Cl.$^6$ .......................... C08J 9/14; C08J 9/00; C08K 5/51; C08G 18/50
[52] U.S. Cl. .......................... 521/106; 521/107; 521/128; 521/131; 521/164; 521/167; 521/174; 521/906
[58] Field of Search .......................... 521/106, 128, 521/164, 167, 174, 906, 131, 107

[56] References Cited

U.S. PATENT DOCUMENTS

| | | | |
|---|---|---|---|
| Re. 30,676 | 7/1981 | Mori et al. | 521/110 |
| 3,072,582 | 1/1963 | Frost | 521/131 |
| 4,097,400 | 6/1978 | Wortmann et al. | 252/182 |
| 4,542,170 | 9/1985 | Hall | 523/179 |
| 4,931,483 | 6/1990 | Matsuoka et al. | 521/137 |
| 5,096,961 | 3/1992 | Eberspach | 524/707 |
| 5,182,309 | 1/1993 | Hutzen | 521/99 |
| 5,302,303 | 4/1994 | Clatty et al. | 521/129 |
| 5,374,486 | 12/1994 | Clatty et al. | 428/423.1 |
| 5,401,824 | 3/1995 | Clatty et al. | 528/53 |
| 5,523,334 | 6/1996 | White, III et al. | 521/164 |
| 5,525,641 | 6/1996 | White, III et al. | 521/131 |
| 5,547,998 | 8/1996 | White, III et al. | 521/131 |

FOREIGN PATENT DOCUMENTS

| | | |
|---|---|---|
| 624 611 | 11/1994 | European Pat. Off. . |
| 665 251 | 12/1994 | European Pat. Off. . |
| 0394769 | 10/1990 | Germany . |

OTHER PUBLICATIONS

Heilig, G., "Pentan –eine FCKW–Alternative für Polyurethan–Hartschaumstoffe," *Kunststoffe* 81:622–625 (1991).
Mann, M., et al. "Hartschaumstoffe mit alternativen Blähmitteln", *Plastverarbeiter* 43:90–96 (1992).

*Primary Examiner*—Rabon Sergent
*Attorney, Agent, or Firm*—Connolly and Hutz

[57] ABSTRACT

The invention relates to a halogen-free, flame retardant rigid polyurethane foam based on polyether-polyols and polyisocyanates, which comprises, as the polyol component, mixtures of nitrogen-free and nitrogen-containing polyether-polyols and, as the flameproofing agent, ammonium polyphosphate.

11 Claims, No Drawings

HALOGEN-FREE, FLAME RETARDANT RIGID POLYURETHANE FOAM

This application is a continuation of application Ser. No. 08/736,829 filed on Oct. 28, 1996, now abandoned.

DESCRIPTION OF THE PRIOR ART

Bans and restrictions on use of completely halogenated fluorochlorohydrocarbons (CFCs), for example on trichlorofluoromethane (R 11), as blowing agents in the production of polyurethane (PUR) rigid foam make it necessary to employ, inter alia, combustible organic compounds as CFC substitutes.

The use of pentane as a blowing agent is already known from U.S. Pat. No. 3,072,582; further information on the use of pentane as a blowing agent for rigid PU foams is to be found in G. Heilig, Pentan—eine FCKW-Alternative für Polyurethan-Hartschaumstoffe [Pentane—a CFC alternative to rigid polyurethane foams], Kunststoffe 81, (1991), pages 622 to 625 and in M. Mann et al., Hartschaumstoffe mit alternativen Blähmitteln [Rigid foams with alternative blowing agents], Plastverarbeiter 43, (1992), 9, pages 90 to 96.

As expected, the use of combustible blowing agents in the production of rigid PU foams leads to problems in flame retardant treatment, and for this reason it has been necessary to adapt the flameproofing systems to the changed conditions.

It was taken into consideration here that by omitting the halogen-containing blowing agents, if halogen-free flameproofing agents were used there was now the chance of producing rigid PU foams from which no corrosive hydrogen halides could be formed in the event of a fire, these often being the cause of secondary damage which exceeds the actual cost of the fire damage severalfold.

EP-A-0 394 769 states that ammonium polyphosphate can be employed in combination with dimethyl methanephosphonate (DMMP) as a flameproofing agent for rigid PU foams with pentane as the blowing agent.

Since dimethyl methanephosphonate is subject to certain restrictions in use on toxicological grounds [classification as a mutagen of category 2 with the R46 label: "Can cause hereditary damage"], formulations which can dispense with the use of DMMP to meet the required fire prevention standards were sought.

Surprisingly, it has now been found that formulations for rigid PU foams which are based on mixtures of nitrogen-free and nitrogen-containing polyether-polyols (cf. Kunststoff-Handbuch [Plastics handbook] "Polyurethane" [Polyurethanes], pages 58–67, Carl Hanser Verlag Munich, 1993) can be formulated as flame retardant without halogens using ammonium polyphosphate.

This was surprising and not foreseeable because rigid PU foams which have been produced either only from nitrogen-free or only from nitrogen-containing polyether-polyols reveal no flameproofing effect when flameproofing agents based on ammonium polyphosphate are used. A considerable intensification of effect, which allows flameproofing standards to be met with economically acceptable use concentrations, is achieved only by combination of nitrogen-free and nitrogen-containing polyether-polyols.

SUMMARY OF THE INVENTION

The invention thus relates to a halogen-free, flame retardant rigid polyurethane foam based on polyether-polyols and polyisocyanates, which comprises, as the polyol component, mixtures of nitrogen-free and nitrogen-containing polyether-polyols and, as the flameproofing agent, ammonium polyphosphate.

DESCRIPTION OF THE PREFERRED EMBODIMENTS

The nitrogen content of the rigid polyurethane foam from the polyol component is preferably between 0.7 and 1.7% by weight.

The rigid polyurethane foam according to the invention comprises 20 to 70 parts by weight, preferably 20 to 50 parts by weight, of the flameproofing agent per 100 parts by weight of polyether-polyol.

The invention also relates to a process for the production of a halogen-free, flame retardant rigid polyurethane foam based on mixtures of nitrogen-containing and nitrogen-free polyether-polyols and polyisocyanates, which comprises adding the flameproofing agent in the form of a paste. Carriers which can be employed in the preparation of the paste are, for example, low-viscosity phosphoric acid triesters.

The paste is preferably formulated thixotropically with highly disperse silicic acid, modified castor oil derivatives, organically modified laminar silicates or mixtures thereof.

EXAMPLES

The experiments for production of halogen-free, flame retardant rigid polyurethane foams were based on the following recipe (parts by weight):

100 parts of polyether-polyol
40 parts of flameproofing agent (cf. Tables 1 and 2)
1.0–3.5*) parts of catalyst (dimethylcyclohexylamine)

*) The amount of catalyst was adjusted according to the activation properties of the nitrogen-containing polyol.

2.0 parts of silicone stabilizer
®DC 193, a silicone glycol copolymer from DOW Corning GmbH, Wiesbaden, with a density of 1.07 g/ml
2.3 parts of water
9–13**) parts of n-pentane having a boiling point of 36° C. and a density of 0.63 g/ml

**) The amount of blowing agent was chosen such that the density of the foam was 35±3 g/l.

variable parts of polyisocyanate (NCO index 110) ®Desmodur 44V20, a diphenylmethane 4,4'-diisocyanate from BAYER AG, Leverkusen, having a viscosity of about 200 mPa.s and a density of 1.235 g/ml at 20° C.

The following polyether-polyols were employed in the examples below:

®Desmophen 4030M, a nitrogen-free polyether-polyol of high functionality and based on sucrose from BAYER AG, Leverkusen, having a hydroxyl number of 380 mg of KOH/g and a density of about 1.11 g/ml at 25° C.

®Desmophen 4051 B, a tetrafunctional polyether-polyol based on amine from BAYER AG, Leverkusen, having a hydroxyl number of 470 mg of KOH/g and a density of about 1.02 g/ml. The analytically determined nitrogen content was 6.1%.

®Voranol RN 411, a nitrogen-free polyether-polyol based on sucrose from DOW Benelux N.V., Terneuzen, NL having a hydroxyl number of 410 mg of KOH/g and a density of 1.10 g/ml at 25° C.

®Voranol RA 640, a polyether-polyol based on amine from DOW Benelux N.V., Terneuzen, NL having a hydroxyl number of 640 mg of KOH/g and a density of 1.03 g/ml at 25° C. The analytically determined nitrogen content was 8.1%.

The following flameproofing agent was employed in the examples below:

®Hostaflam AP 422, a long-chain ammonium polyphosphate of low water-solubility from Hoechst AG, Frankfurt, having a density of 1.9 g/ml, a phosphorus content of 31.5% by weight and a nitrogen content of 14.5% by weight.

To evaluate the flame retardancy, burning tests were carried out in accordance with DIN 4102, Part 1, with in each case 5 specimens of dimensions 90×190 mm (edge flaming).

For rigid polyurethane foams which are to be employed as building materials (insulation materials) in Germany, classification into class DIN 4102-B2 is specified as compulsory.

The experiments show that, in spite of the use of 40 php of ammonium polyphosphate, a flameproofing effect is observed neither with the nitrogen-free polyol (Examples 1 and 6) nor with the nitrogen-containing polyol (Examples 5 and 10).

Only with polyol mixtures having the optimum nitrogen content (Examples 3 and 8) can classifications into class DIN 4102-B2 be achieved.

The same trend is even more pronounced if a flameproofing agent paste which has been formulated thixotropically and is based on ammonium polyphosphate/triethyl phosphate is used (cf. Table 2).

TABLE 1

Experiments to produce flame retardant rigid polyurethane foams

Flameproofing agent: Type: ®Hostaflam AP 422
Amount: 40 php (40 parts/100 parts of polyol)

| Example No. | Polyol Type | Content | N content of the PUR foam from the polyol component (%) | Gross density (kg/cm$^3$) | DIN 4102 test Flame height (mm)* | Class** |
|---|---|---|---|---|---|---|
| 1 (comparison) | Desmophen 4030M | 100% | — | 33 | >250 | B3 |
| 2 (comparison) | Desmophen 4030M | 70% | 0.60 | 34 | 200 | B3 |
|  | Desmophen 4051B | 30% |  |  |  |  |
| 3 (invention) | Desmophen 4030M | 50% | 0.99 | 35 | 135 | B2 |
|  | Desmophen 4051B | 50% |  |  |  |  |
| 4 (invention) | Desmophen 4030M | 30% | 1.37 | 36 | 190 | B3 |
|  | Desmophen 4051B | 70% |  |  |  |  |
| 5 (comparison) | Desmophen 4051B | 100% | 1.92 | 35 | >250 | B3 |
| 6 (comparison | Voranol RN411 | 100% | — | 35 | >250 | B3 |
| 7 (invention) | Voranol RN411 | 70% | 0.75 | 35 | 200 | B3 |
|  | Voranol RA640 | 36% |  |  |  |  |
| 8 (invention) | Voranol RN411 | 50% | 1.21 | 36 | 145 | B2 |
|  | Voranol RA640 | 50% |  |  |  |  |
| 9 (invention) | Voranol RN411 | 30% | 1.63 | 37 | 180 | B3 |
|  | Voranol RA640 | 70% |  |  |  |  |
| 10 (comparison) | Voranol RA640 | 100% | 2.21 | 35 | >250 | B3 |

*Mean of 5 individual measurements
**Classification criterion: flame height ≦ 150 mm: class B2

TABLE 2

Experiments to produce flame retardant polyether rigid foams

Flameproofing agent: Type: ®Hostaflam AP 422, amount: 24 php } in the form of a thixotropically formulated flameproofing agent paste
Triethyl phosphate, amount: 16 php

| Example No. | Polyol Type | Content | N content of the PUR foam from the polyol component (%) | Gross density (kg/cm$^3$) | DIN 4102 test Flame height (mm)* | Class** |
|---|---|---|---|---|---|---|
| 11 (comparison) | Voranor RN 411 | 100% | — | 35 | >250 | B3 |
| 12 (invention) | Voranor RN 411 | 60% | 1.00 | 34 | 160 | B3 |
|  | Voranor RA 640 | 40% |  |  |  |  |
| 13 (invention) | Voranor RN 411 | 50% | 1.17 | 36 | 140 | B2 |
|  | Voranor RA 640 | 50% |  |  |  |  |
| 14 (invention) | Voranor RN 411 | 40% | 1.38 | 36 | 135 | B2 |
|  | Voranor RA 640 | 60% |  |  |  |  |
| 15 (comparison) | Voranor RA 640 | 100% | 2.15 | 36 | 220 | B3 |

*Mean of 5 individual measurements
**Classification criterion: flame height ≦ 150 mm: class B2

What is claimed is:

1. A halogen-free, flame retardant rigid polyurethane foam formed from polyether-polyols, polyisocyanates, and a flameproofing agent, the polyol component comprising a mixture of nitrogen-free and nitrogen-containing polyether-polyols, the flameproofing agent comprising ammonium polyphosphate, wherein the polyurethane foam has a nitrogen content from the polyol component of between 0.7 and 1.7% by weight, said nitrogen content being based on the weight of the polyurethane foam.

2. The rigid polyurethane foam as claimed in claim 1, wherein the nitrogen content from the polyol component is between 0.75 and 1.63% by weight, said nitrogen content being based on the weight of the polyurethane foam.

3. The rigid polyurethane foam as claimed in claim 2, wherein the nitrogen content from the polyol component is between 0.99 and 1.21% by weight, said nitrogen content being based on the weight of the polyurethane foam.

4. The rigid polyurethane foam as claimed in claim 1, comprising 20 to 70 parts by weight of the flameproofing agent per 100 parts by weight of the polyol component.

5. The rigid polyurethane foam as claimed in claim 4, wherein the flameproofing agent comprises 20 to 50 parts by weight per 100 parts by weight of the polyol component.

6. The rigid polyurethane foam as claimed in claim 5, wherein the flame-proofing agent comprises 40 parts by weight per 100 parts by weight of the polyol component.

7. The rigid polyurethane foam as claimed in claim 1, further comprising a blowing agent.

8. The rigid polyurethane foam as claimed in claim 7, wherein the blowing agent comprises pentane.

9. The rigid polyurethane foam as claimed in claim 8, wherein the pentane comprises 9 to 13 parts by weight per 40 parts by weight of the flameproofing agent and 100 parts per weight of the polyol component.

10. A process for producing a halogen-free, flame retardant rigid polyurethane foam formed from polyether-polyols, polyisocyanates, and a flameproofing agent, the polyol, component comprising a mixture of nitrogen-containing and nitrogen-free polyether-polyols, the process comprising the step of adding the flameproofing agent in a form of a paste to the polyurethane foam, wherein the flameproofing paste comprises ammonium polyphosphate dispersed in a carrier, the carrier comprising phosphoric acid triester, and wherein the polyurethane foam has a nitrogen content from the polyol component of between 0.7 and 1.7% by weight, said nitrogen content being based on the weight of the polyurethane foam.

11. The process for producing a halogen-free, flame retardant rigid polyurethane foam as claimed in claim 10, wherein the paste has been formulated thixotropically with dispersed silicic acid, castor oil derivatives, organic laminar silicates, or a mixture thereof.

* * * * *